(12) United States Patent
Romer et al.

(10) Patent No.: US 12,403,464 B2
(45) Date of Patent: Sep. 2, 2025

(54) INTEGRATED MOTOR CASSETTE FOR CONNECTION TO AND FOR USE IN A PIPETTING SYSTEM, PIPETTING SYSTEM, AND METHOD FOR EXCHANGING AN INTEGRATED MOTOR CASSETTE OF A PIPETTING SYSTEM

(71) Applicant: HAMILTON BONADUZ AG, Bonaduz (CH)

(72) Inventors: Hanspeter Romer, Hinwil (CH); Fridolin Gysel, Adliswil (CH); Silvio Walpen, Thalwil (CH); Reto Ettinger, Uster (CH)

(73) Assignee: HAMILTON BONADUZ AG, Bonaduz (CH)

( * ) Notice: Subject to any disclaimer, the term of this patent is extended or adjusted under 35 U.S.C. 154(b) by 543 days.

(21) Appl. No.: 16/630,334

(22) PCT Filed: Jul. 2, 2018

(86) PCT No.: PCT/EP2018/067822
§ 371 (c)(1),
(2) Date: Feb. 26, 2020

(87) PCT Pub. No.: WO2019/011698
PCT Pub. Date: Jan. 17, 2019

(65) Prior Publication Data
US 2020/0298225 A1    Sep. 24, 2020

(30) Foreign Application Priority Data
Jul. 13, 2017 (DE) .......................... 102017115796.4

(51) Int. Cl.
*B01L 3/02*      (2006.01)
*G01N 35/04*   (2006.01)
*G01N 35/10*   (2006.01)

(52) U.S. Cl.
CPC ............ *B01L 3/0227* (2013.01); *G01N 35/04* (2013.01); *G01N 35/10* (2013.01);
(Continued)

(58) Field of Classification Search
CPC ............. B01L 3/0227; B01L 2200/025; B01L 2400/043; G01N 35/04; G01N 35/10; G01N 2035/0477
See application file for complete search history.

(56) References Cited

U.S. PATENT DOCUMENTS 5,090,255 A * 2/1992 Kenney ................. B01L 3/0227
73/864.18
2002/0131903 A1* 9/2002 Ingenhoven ............ B01L 3/021
422/510
(Continued)

FOREIGN PATENT DOCUMENTS

CN     101143340 A     3/2008
CN     101839486 A     9/2010
(Continued)

OTHER PUBLICATIONS

Translation of JP2012167968A, Koji Inoue, Sep. 6, 2012 (Year: 2012).*
(Continued)

*Primary Examiner* — Henry H Nguyen
(74) *Attorney, Agent, or Firm* — Wiggin and Dana LLP (57) ABSTRACT

An integrated motor cartridge (2) for connection to and for use in a pipetting system comprises a housing (4); a guide tube (14); a piston (16) provided with a plurality of permanent magnets (18), the piston having a pressure tube facing side and a pressure tube distal side, the piston being arranged in the guide tube and the piston having at least one seal (24) with respect to the guide tube; and a coil assembly (20) by means of which the piston can be moved in the guide tube
(Continued)

when power is supplied to the coil assembly; wherein the guide tube, the piston and the coil assembly are arranged in the housing. The integrated motor cartridge further comprises a pressure tube connection (6) by means of which the guide tube, on the pressure tube facing side of the piston, can be connected to a pressure tube of the pipetting system in a gastight manner; and a power connection (8) which is coupled to the coil assembly and adapted to be coupled to a power supply arranged outside of the integrated motor cartridge; wherein the integrated motor cartridge can be introduced into and removed from the pipetting system as a unit.

21 Claims, 6 Drawing Sheets

(52) U.S. Cl.
CPC ... *B01L 2200/025* (2013.01); *B01L 2400/043* (2013.01); *G01N 2035/0477* (2013.01)

(56) References Cited

U.S. PATENT DOCUMENTS

| | | | | |
|---|---|---|---|---|
| 2003/0190264 | A1* | 10/2003 | Yiu | B01L 3/0227 422/525 |
| 2004/0166502 | A1* | 8/2004 | Lai | G01N 35/1065 436/526 |
| 2005/0250210 | A1* | 11/2005 | Pilkington | B01L 9/06 436/43 |
| 2005/0275396 | A1* | 12/2005 | Kitani | G01N 35/00594 324/76.61 |
| 2009/0000350 | A1 | 1/2009 | Magnussen et al. | |
| 2011/0013176 | A1* | 1/2011 | Schwarz | G01B 11/0608 356/402 |
| 2013/0001242 | A1* | 1/2013 | Hofstetter | F04B 7/0015 222/1 |
| 2016/0069715 | A1* | 3/2016 | Sinz | G01N 35/00 324/202 |
| 2017/0043336 | A1* | 2/2017 | Khattak | G01N 35/00029 |
| 2017/0176215 | A1* | 6/2017 | Yamagishi | G01D 5/145 |
| 2018/0088164 | A1* | 3/2018 | Cibula | C21C 5/5211 |

FOREIGN PATENT DOCUMENTS

| | | |
|---|---|---|
| CN | 103657754 A | 3/2014 |
| CN | 103889578 A | 6/2014 |
| CN | 104661737 A | 5/2015 |
| CN | 106919232 A | 7/2017 |
| DE | 102012214677 A1 | 2/2014 |
| DE | 102015214566 A1 | 2/2017 |
| DE | 102016008101 A1 | 1/2018 |
| DE | 102016220424 A1 | 4/2018 |
| DE | 102016220425 A1 | 4/2018 |
| DE | 102016225209 A1 | 6/2018 |
| DE | 102017201114 A1 | 7/2018 |
| EP | 0796658 A2 | 9/1997 |
| EP | 1614468 A1 | 1/2006 |
| JP | 2012167968 A | 9/2012 |
| WO | 2005079989 A1 | 9/2005 |
| WO | 2011083125 A1 | 7/2011 |
| WO | 2014-02-20 A1 | 2/2014 |
| WO | 2014/027100 A1 | 2/2014 |
| WO | 2017017084 A1 | 2/2017 |

OTHER PUBLICATIONS

Translation of CN101839486A, K Karthick, Sep. 22, 2010 (Year: 2010).*
Translation of WO 2014027100 A1, Kirste Vinzenz, Feb. 20, 2014 (Year: 2014).*
International Preliminary Report on Patentability, dated Jan. 23, 2020, for International Application No. PCT/EP2018/067822.
German Patent and Trademark Office Search Report, dated Mar. 22, 2018, for German Patent Application No. DE102017115796.4.
Communication pursuant to Article 94 (3) EPC, EP Application No. 18 737 239.6-1101, dated Mar. 13, 2024, interview summary on p. 3/3 (in German).

* cited by examiner

INTEGRATED MOTOR CASSETTE FOR CONNECTION TO AND FOR USE IN A PIPETTING SYSTEM, PIPETTING SYSTEM, AND METHOD FOR EXCHANGING AN INTEGRATED MOTOR CASSETTE OF A PIPETTING SYSTEM

FIELD

The present invention pertains to the field of pipetting systems and their components. In particular, the present invention relates to pipetting systems in which pipetting liquid is aspirated or dispensed via a compressed air volume.

BACKGROUND

Modern pipetting systems are highly complex technical systems. An example of a pipetting system is disclosed in WO 2011/083125 A1. Modern pipetting systems are designed to aspirate and dispense very small quantities of pipetting liquid at high speed and with high accuracy. In addition, a plurality of pipetting tips are often arranged in a grid pattern in order to be able to perform a plurality of pipetting operations simultaneously. For the aspiration and dispensation through each individual pipetting tip, there is utilized an associated electric motor. As a result hereof, a complex arrangement is created which aims at ensuring high precision and high speed in a small space. For such complex pipetting systems, maintenance thereof is often difficult.

SUMMARY

Accordingly, it would be desirable to provide components for pipetting systems and pipetting systems that simplify the maintenance thereof.

Exemplary embodiments of the invention comprise an integrated motor cartridge for connection to and use in a pipetting system, comprising a housing; a guide tube; a piston provided with a plurality of permanent magnets, the piston having a pressure tube facing side and a pressure tube distal side, wherein the piston is arranged in the guide tube and wherein the piston has at least one seal with respect to the guide tube; and a coil assembly by means of which the piston can be moved in the guide tube when current is supplied to the coil assembly; wherein the guide tube, the piston and the coil assembly are arranged in the housing. The integrated motor cartridge further comprises a pressure tube connection by means of which the guide tube, on the pressure tube facing side of the piston, can be connected in a gastight manner to a pressure tube of the pipetting system; and a power connection which is coupled to the coil assembly and adapted to be coupled to a power supply arranged outside of the integrated motor cartridge; wherein the integrated motor cartridge can be introduced into and removed from the pipetting system as a unit. Exemplary embodiments of the invention make it possible to replace an electric motor of a pipetting system as a complete unit. Due to the fact that the piston along with a plurality of permanent magnets, the guide tube and the coil assembly are arranged in a common housing, the entirety of these components can be replaced by a mechanically simple exchange of the housing. The pressure tube connection and the power connection in this regard form two well-defined interfaces, via which the integrated motor cartridge is supplied with energy on the one hand and on the other hand is adapted to pass on the pressure generated by the piston to a pressure tube of the pipetting system. Thus, the integrated motor cartridge is a compara-tively easily replaceable unit which enables the functions of power supply and the provision of air pressure via the defined interfaces thereof. An electric motor of the pipetting system can thus be replaced as an integrated, complete unit and the maintenance of the pipetting system can be considerably simplified.

Via the pressure tube connection, the guide tube on the pressure tube facing side of the piston can be connected in a gastight manner to a pressure tube of the pipetting system. In this way, the guide tube of the integrated motor cartridge and the pressure tube of the pipetting system, optionally along with a pipetting tip connected thereto, constitute a closed compressed air volume for aspirating and dispensing pipetting liquid. The term closed compressed air volume designates a volume that is closed on all sides except the opening in the pipetting tip, if a pipetting tip is connected, or with the exception of the end of the pressure tube of the pipetting system that is intended for the connection of the pipetting tip. Thus, the closed compressed air volume has a defined opening through which the pipetting liquid can be aspirated and dispensed.

The coil assembly, the guide tube and the pressure tube connection are arranged in a stationary manner in the housing of the integrated motor cartridge. Consequently, when the integrated motor cartridge is connected to a pipetting system, these components have fixed and well defined positions with respect to the remainder of the pipetting system, and thus can reliably cooperate with the remaining components of the pipetting system.

The piston is movable in the guide tube. In particular, the piston may be linearly movable within the guide tube and thereby move toward the pressure tube connection and away from the pressure tube connection. Thus, the piston and the guide tube each have a pressure tube facing side and a pressure tube distal side. Also with respect to the housing and with respect to the integrated motor cartridge as such, one can speak of a pressure tube facing side and a pressure tube distal side.

The pressure tube connection may be part of the guide tube, i.e. constitute a unit formed integrally with the guide tube, or may be a structure adjoining the guide tube. In the latter case, the pressure tube connection and the guide tube are connected to each other in a gastight manner, so that the afore-mentioned compressed air volume is created upon connection to the pressure tube of the pipetting system.

The coil assembly comprises a plurality of coils arranged along the guide tube. When current flows through the plurality of coils, said coils interact with the plurality of permanent magnets of the piston. In this way, the piston can be moved quickly and precisely within the guide tube, as is known per se to those skilled in the art.

In addition to the ease of mechanical handling, the housing can provide for an effective shielding of the magnetic field within the integrated motor cartridge. Also, the housing can be used for the magnetic fields in the integrated motor cartridge. For example, a magnetic return path through the housing and thus an increase of the motor power can take place. The coils and/or the current through the coils can be made smaller in this way.

According to a further embodiment, the pressure tube connection is designed to fix the position of the integrated motor cartridge with respect to the pipetting system. In other words, the pressure tube connection can be designed to align the integrated motor cartridge with respect to the pipetting system. In this way, the pressure tube connection not only provides a gastight connection to a pressure tube of the pipetting system, but also contributes to the correct positioning of the integrated motor cartridge in the pipetting system, whereby the precise interaction between the piston in the guide tube and the compressed air volume in the pressure tube of the pipetting system is rendered possible. As described in detail below, the integrated motor cartridge may have other components for position fixing/orientation purposes in addition to the pressure tube connection.

According to a further embodiment, the pressure tube connection has a receptacle for a motor facing side of the pressure tube. The receptacle of the pressure tube connection may be a recess, in particular a cylindrical recess. Thus, it may be a hollow-cylindrical receptacle on the part of the integrated motor cartridge. Such a cylindrical receptacle is suitable for receiving a cylindrical pressure tube.

According to a further embodiment, the receptacle has a contact surface for an O-ring arranged around the pressure tube. An O-ring is a comparatively simple and effective means for creating the airtight connection between the pressure tube of the pipetting system and the pressure tube connection of the integrated motor cartridge, and thus indirectly to the guide tube of the integrated motor cartridge. The contact surface of the pressure tube connection for the O-ring may have a circumferential groove holding the O-ring in position. However, the configuration may also be such that the O-ring is provided at a specific location by the design of the pressure tube. In this event, the contact surface for the O-ring may be a partial surface of the receptacle, in particular a partial surface of the cylindrical recess.

According to a further embodiment, the power connection is designed as a printed circuit. A printed circuit is a robust and spatially defined structure which can be readily built into the integrated motor cartridge and contributes to an overall robust construction of the integrated motor cartridge.

According to a further embodiment, the printed circuit is disposed within the housing along the guide tube. In this manner, the printed circuit can easily be connected to the plurality of coils which are also arranged along the guide tube.

According to a further embodiment, the printed circuit extends through the housing in a pressure tube distal end portion of the integrated motor cartridge. In this manner, the power connection to the outside of the integrated motor cartridge is provided in a region that is readily accessible and not so critical in terms of space as other external regions of the integrated motor cartridge. This is the case in particular when the integrated motor cartridge is arranged in a grid pattern beside other like integrated motor cartridges.

According to a further embodiment, the integrated motor cartridge further comprises a plurality of magnetic field sensors arranged within the housing along the guide tube for determining the position of the piston. The plurality of magnetic field sensors are arranged within the housing in a stationary manner. The magnetic field sensors may be Hall sensors, for example. Magnetic field sensors are an effective means for determining the position of the piston in the guide tube as well as for controlling and monitoring the piston and thus the aspirating/dispensing of pipetting liquid on the basis of this information. By providing magnetic field sensors in the integrated motor cartridge, it is conveniently possible to replace also this system for position determination together with the electric motor.

According to a further embodiment, the integrated motor cartridge further comprises a sensor data connection coupled to the plurality of magnetic field sensors and adapted to be coupled to a control unit of the pipetting system arranged outside of the integrated motor cartridge. In this manner, there is provided an additional defined interface via which the integrated motor cartridge is integrated in the overall construction of the pipetting system. The sensor data for determining the position of the piston thus can be transferred to the outside of the integrated motor cartridge, where a control unit of the pipetting system can centrally control the aspiration and dispensing operations of a plurality of pipetting units on the basis of the data available. However, it is also possible to evaluate the data of the magnetic field sensors within the integrated motor cartridge. In this case, it is possible that there is no sensor data connection present or that a reduced data connection is present, via which only the position of the piston is communicated to the control unit.

According to a further embodiment, the integrated motor cartridge further comprises a memory element. The memory element can be used in multiple ways, e.g. for storing sensor data or for storing calibration data, as described in detail below.

According to a further embodiment, the memory element is provided with calibration data, with the calibration data describing a correlation between measured values of the magnetic field sensors and the position of the piston. The calibration data may be such that the position of the piston in the guide tube can be determined very accurately from the joint consideration of the measured values of the magnetic field sensors and the calibration data. Due to the presence of the calibration data, the electric motor consisting of the piston and the coil assembly can be precisely operated in a direct manner, without necessitating motion of the piston to a reference position or a similar initialization routine. The electric motor of the integrated motor cartridge can be used immediately upon connection of the integrated motor cartridge to the pipetting system. The calibration data may be the result of a calibration process performed during manufacture of the integrated motor cartridge, i.e. the result of a calibration process performed prior to connection of the integrated motor cartridge to the pipetting system. Thus, the integrated motor cartridge constitutes an easily replaceable and directly usable overall unit, which, during connection to the pipetting system, need not be adjusted and calibrated separately. The correlation between measured values of the magnetic field sensors and the position of the piston may be present in the form of a lookup table or a description in the form of a formula or in any other suitable form.

According to a further embodiment, the calibration data further include a description of the influence of the current flow of the coil assembly on the measured values of the magnetic field sensors. This description of the influence of the current flow of the coil assembly may be present in the form of a lookup table or as a description in the form of a formula or in any other suitable form. On the basis of this description, it is possible to exclude, by calculation, the influence of the magnetic field of the coil assembly on the measured values of the magnetic field sensors. In this manner, it is possible in particularly reliable manner to conclude from the measured values of the magnetic field sensors the position of the piston in the guide tube. In particular, a control unit controlling the current flow to the coils of the coil assembly can directly eliminate the influence of this current flow on the magnetic field from the measured values.

According to a further embodiment, the calibration data can be read out by a control unit of the pipetting system. In particular, the calibration data can be readable via the sensor data connection described hereinbefore. Thus, for transmitting the measured values of the plurality of magnetic field sensors and the calibration data, there is provided only one data connection, which is favorable as regards the space requirement and the complexity of the integrated motor cartridge. However, it is also possible that the calibration data are readable via a separate calibration data connection.

According to a further embodiment, the coil assembly comprises a plurality of coils arranged in a circular manner around the guide tube. By way of this direct arrangement around the guide tube, the piston can be moved in the guide tube with high efficiency.

According to a further embodiment, the housing is made of a magnetically soft material, in particular of a magnetically soft nickel-iron alloy. A magnetically soft material, in particular a magnetically soft nickel-iron alloy, is particularly suitable as a magnetic shield as well as for providing the magnetic return path through the housing.

According to a further embodiment, the size of the housing is adapted to the grid of the pipetting system, in particular to a standardized grid pattern. The integrated motor cartridge thus can be conveniently used in all pipetting systems making use of a multiplicity of pipetting units in a predetermined grid, in particular a standardized grid. In particular, in a pipetting system comprising a plurality of pressure tubes arranged in a grid pattern, a plurality of integrated motor cartridges can be arranged beside each other. If necessary, individual integrated motor cartridges can be replaced, with maintenance being simplified also by the fact that the integrated motor cartridges located around the integrated motor cartridge to be replaced are insensitive with respect to the maintenance taking place due to their respective housings.

According to a further embodiment, the housing has a substantially rectangular cross section. Due to the substantially rectangular cross section, the integrated motor cartridge can be readily introduced in a grid pattern of the pipetting system. The feature that the housing has a substantially rectangular cross section does not mean that such a cross section must be present along the entire length of the integrated motor cartridge. Rather, the feature points out that the cross section is substantially rectangular at least along a large part of the main direction of extension of the integrated motor cartridge, for example, at least along 80% of the length of the integrated motor cartridge. The main direction of extension of the integrated motor cartridge corresponds to the direction of extension of the guide tube.

According to a further embodiment, the housing, in cross section, has an area between 50 mm$^2$ and 200 mm$^2$, in particular between 100 mm$^2$ and 150 mm$^2$, still more in particular between 130 mm$^2$ and 140 mm$^2$.

According to a further embodiment, the longer side of the substantially rectangular cross section has a length between 12 mm and 20 mm, in particular between 14 mm and 18 mm, still more in particular between 15 mm and 16 mm.

According to a further embodiment, the shorter side of the substantially rectangular cross section has a length of less than 9 mm, in particular a length between 7 mm and 9 mm, still more in particular between 8 mm and 9 mm. With a maximum length of the shorter side of the substantially rectangular cross section that is below 9 mm, the integrated motor cartridge can be conveniently inserted in common grid patterns.

According to a further embodiment, the piston has a seal with respect to the guide tube on the pressure tube facing side. Moreover, it is also possible that the piston has an additional seal with respect to the guide tube on the pressure tube distal side. In this manner, there are provided two seals of the piston with respect to the guide tube, and it is possible to provide for a symmetrical motion behavior of the piston in the directions towards the pressure tube and away from the pressure tube.

According to a further embodiment, the complete travel way of the piston is within the housing. In this manner, the piston is mechanically protected by the housing against external effects in any position. Moreover, detent torque exerted by the piston on the guide tube and the other components is minimized in this manner.

According to a further embodiment, a stopper for the piston or an air filter or an integrated stopper/air filter unit is provided on the pressure tube distal side of the guide tube. By way of the stopper, the piston can be effectively limited in its motion, and there is a defined end of the utilized portion of the guide tube. It is thus ensured that the piston cannot interact in an undesired manner with the other components provided in the housing. The air filter is in effective means for keeping the guide tube free from external influences, such as e.g. dust, so that the precise and sealed motion of the piston with respect to the guide tube can be reliably ensured over a long period of time.

According to a further embodiment, the integrated motor cartridge further comprises a temperature sensor arranged within the housing for temperature measurement within the integrated motor cartridge. Furthermore, the integrated motor cartridge may comprise a data connection for transmitting temperature measurement values. This may be a separate data connection. However, it is also possible that the sensor data connection described hereinbefore and provided for the magnetic field data is also used for transmitting the temperature measurements. It is possible to determine via the temperature sensor whether the electric motor within the integrated motor cartridge is subjected to excessive loads. On the basis of this information, the current flow through the coils of the coil assembly can be terminated before the electric motor of the integrated motor cartridge suffers damage. Especially in the closed system of the integrated motor cartridge, the possibility of monitoring the temperature is particularly valuable since the components are shielded from the external environment by the housing and cannot be inspected.

According to a further embodiment, the integrated motor cartridge further comprises a cooling duct arranged within the housing along the guide tube and having a first opening through the housing on the pressure tube facing side of the housing and a second opening through the housing on the pressure tube distal side of the housing. It is thus possible to effectively cool the interior of the housing via a cooling air flow within the cooling duct. Due to the fact that the integrated motor cartridge will generally be arranged vertically in a pipetting system, a chimney effect is created through the cooling duct from the pressure tube facing side of the housing to the pressure tube distal side, which provides for effective cooling of the housing interior.

According to a further embodiment of the invention, the integrated motor cartridge further comprises a support on the pressure tube distal side of the housing, with which the integrated motor cartridge can be fixed with respect to the pipetting system. It is thus possible to achieve a good positional fixation of the integrated motor cartridge on the pressure tube distal side with respect to the remainder of the pipetting system. Together with the afore-described positional fixation of the integrated motor cartridge by way of the pressure tube connection, there is achieved a positional fixation of the integrated motor cartridge in both end portions thereof, so that an overall reliable and precise positioning of the integrated motor cartridge in the pipetting system can be provided particularly well.

According to a further embodiment, the support has a contact surface adapted to be engaged with a complementary contact surface of the pipetting system for alignment of the integrated motor cartridge. The abutment of the contact surface on a complementary contact surface allows for a very exact alignment of the integrated motor cartridge via the two contact surfaces.

According to a further embodiment, the support has a guide member adapted to be introduced in a recess of the pipetting system for alignment of the integrated motor cartridge. While the guide member may abut on the pipetting system, it is also possible for the guide member to be introduced into the recess of the pipetting system without abutting a counter-surface. In other words, the guide member may be arranged with play in a recess. In this manner, the insertion of the integrated motor cartridge can be simplified as compared to the situation of complimentary contact surfaces described above, while nevertheless a certain positional fixation is implemented.

According to a further embodiment, the support has a receptacle, in particular a hole or threaded hole, for introducing a securing or locking element provided on the pipetting system, in particular a locking pin or a locking screw. By way of the interaction between a locking element of the pipetting system and a corresponding receptacle in the support of the integrated motor cartridge, a particularly good positional fixation of the integrated motor cartridge in the pipetting system can be achieved.

Exemplary embodiments of the invention further comprise a pipetting system for aspirating and dispensing pipetting liquid, comprising at least one pressure tube, each of the at least one pressure tube having a coupling device for coupling a pipetting tip to the respective pressure tube; and comprising, for each of the at least one pressure tube, a motor cartridge connection for connecting the pipetting system to a respective integrated motor cartridge according to any of the embodiments described hereinbefore. The modification, additional features and effects described above with respect to the integrated motor cartridge are applicable analogously to the pipetting system for aspirating and dispensing pipetting liquid. The integrated motor cartridge may be inserted into and removed from the pipetting system as a unit. When the integrated motor cartridge is inserted in the pipetting system, it is a constituent part of the pipetting system.

According to a further embodiment, the pipetting system comprises a plurality of pressure tubes. In particular, the pipetting system may comprise a plurality of pressure tubes arranged in a grid pattern, e.g. 96 pressure tubes. It is possible that, for all pressure tubes of the pipetting system, there is provided a respective motor cartridge connection for connecting the pipetting system to a respective integrated motor cartridge. However, it is also possible and encompassed by the invention that, for a portion of the pressure tubes, motor cartridge connections for connecting the pipetting system to respective integrated motor cartridges are provided, while another portion of the pressure tubes is connected to other designs of electric motors.

According to a further embodiment, the motor cartridge connection comprises a pressure tube connection on the side of the pipetting system, which can be connected to the pressure tube connection of the integrated motor cartridge in a gastight manner. In a further embodiment, the pressure tube connection on the side of the pipetting system comprises a free end of the pressure tube which is adapted to be inserted into a corresponding receptacle of the pressure tube connection of the integrated motor cartridge. The free end of the pressure tube may be, for example, a freestanding end of the pressure tube which protrudes from the housing of the pipetting system. In particular, the free end may protrude on the inside of the housing of the pipetting system. Thus, the integrated motor cartridge in the interior of the pipetting system can be placed onto the free end of the pressure tube. The free end of the pressure tube may comprise an O-ring arranged around the pressure tube.

According to a further embodiment, the pipetting system further comprises, for each of the at least one pressure tube, a securing or locking element, in particular a locking pin or a locking screw, by means of which the integrated motor cartridge can be fixed with respect to the pipetting system. The locking element may be inserted in or threadedly engaged with a corresponding receptacle of a support of the integrated motor cartridge, in particular a hole or a threaded hole. It is also possible to engage the locking element with a guide member of the support of the integrated motor cartridge, thus effecting a positional fixation. For example, a locking screw can be positioned with its end placed against a guide member of the support of the integrated motor cartridge such that the guide member is fixed.

According to a further embodiment, the pipetting system comprises a control unit that is configured to control an integrated motor cartridge for aspirating and dispensing pipetting liquid.

According to a further embodiment, the control unit is adapted to be coupled to the coil assembly of the integrated motor cartridge and configured to control a motion of the piston. In particular, the control unit may be connected to the power connection of the integrated motor cartridge and supply corresponding currents to the coils of the coil assembly of the integrated motor cartridge via the power connection and thereby control the motion of the piston. In this case, the amount of the current through the coils is determined by the control unit outside of the integrated motor cartridge. It is also possible that the control unit transmits control signals to the integrated motor cartridge and that the integrated motor cartridge is capable to set the levels of the currents to the coils via the power connection in conformity with the control signals.

According to a further embodiment, the control unit is adapted to be coupled to a plurality of magnetic field sensors of the integrated motor cartridge and is configured to determine the position of the piston on the basis of measured values of the magnetic field sensors. In particular, the control unit may be connected to a sensor data connection of the integrated motor cartridge for receiving the measured values of the magnetic field sensors.

According to a further embodiment, the control unit is adapted to be coupled to a memory element of the integrated motor cartridge and configured to read out data, in particular calibration data, from the memory element. In this manner, the control unit can access the data present in the integrated motor cartridge. With the aid of the calibration data, the control unit can control the coils of the coil assembly of the integrated motor cartridge such that a highly precise motion of the piston is facilitated.

Exemplary embodiments of the invention further comprise a method of replacing an integrated motor cartridge of a pipetting system, comprising the steps of: removing a first integrated motor cartridge from the pipetting system, wherein the first integrated motor cartridge is in accordance with any of the embodiments described hereinbefore and wherein the step of removing comprises releasing the pressure tube connection of the first integrated motor cartridge from a pressure tube connection on the side of the pipetting system; and inserting a second integrated motor cartridge into the pipetting system, wherein the second integrated motor cartridge is in accordance with any of the embodiments described hereinbefore and wherein the step of inserting comprises connecting the pressure tube connection of the second integrated motor cartridge to the pressure tube connection on the side of the pipetting system.

According to a further embodiment, the step of removing the first integrated motor cartridge comprises at least one of the following steps: releasing the power connection of the first integrated motor cartridge from a power connection on the side of the pipetting system, releasing a sensor data connection of the first integrated motor cartridge from a sensor data connection on the side of the pipetting system, releasing a support on the pressure tube distal side of the housing of the first integrated motor cartridge from the pipetting system. The step of inserting the second integrated motor cartridge may further comprise at least one of the following steps: connecting the power connection of the second integrated motor cartridge to the power connection on the side of the pipetting system, connecting a sensor data connection of the second integrated motor cartridge to the sensor data connection on the side of the pipetting system, connecting a support on the pressure tube distal side of the housing of the second integrated motor cartridge to the pipetting system.

BRIEF DESCRIPTION OF THE DRAWINGS

Further exemplary embodiments of the invention will be described in the following with reference to the drawings in which.

DETAILED DESCRIPTION

Figure 1:
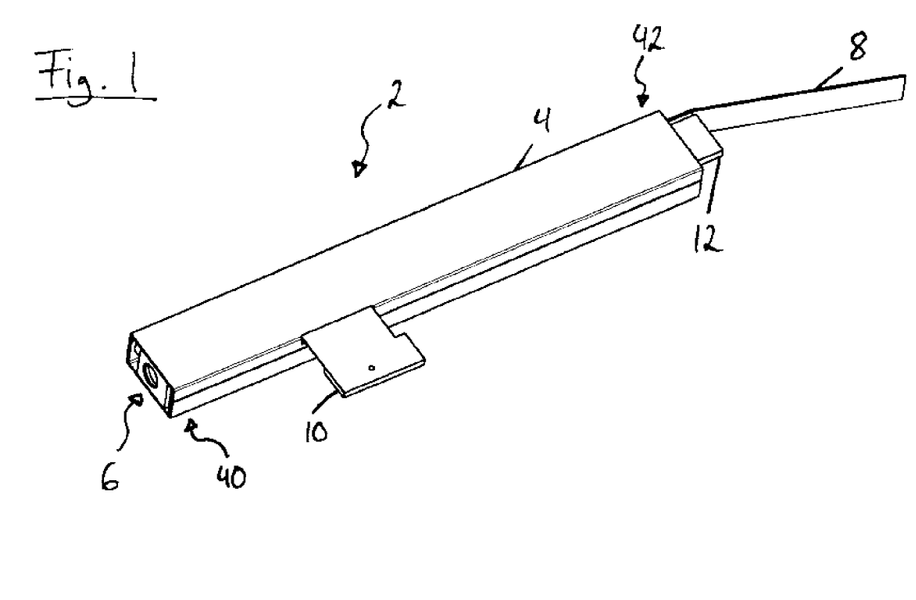
FIG. 1 shows an integrated motor cartridge according to an exemplary embodiment of the invention in a perspective view.

FIG. 1 shows an integrated motor cartridge 2 according to an exemplary embodiment of the invention in a perspective view from the outside. The integrated motor cartridge 2 comprises a housing 4. The housing 4 substantially has a substantially cuboid shape. The housing 4 has a main direction of extension, which in the perspective view of FIG. 1 is from the lower left to the upper right. The housing 4 has a pressure tube facing end portion 40 and a pressure tube distal end portion 42. The main direction of extension of the housing 4 is from the pressure tube facing end portion 40 to the pressure tube distal end portion 42. In the cross-sections through the housing 4 perpendicular to the main direction of extension, the housing 4 has a substantially rectangular cross section.

In the pressure tube facing end portion 40, the integrated motor cartridge 2 has a pressure tube connection 6. The pressure tube connection 6 has a cylindrical receptacle into which a pressure tube of a pipetting system can be introduced, as will be described in detail below. In the pressure tube distal end portion 42, the integrated motor cartridge 2 has a guide member 12. The guide member 12 is an extension of the housing 2 along the main direction of extension, but has a much smaller cross section than the housing 4. By means of the guide member 12, the integrated motor cartridge 2 can be positionally fixed in a pipetting system, as will be described in detail below.

The integrated motor cartridge 2 further comprises a power connection 8. The power connection 8 is a printed circuit that supplies power to the coils provided in the housing 4 and protrudes from the housing 4, as shown in FIG. 1. The printed circuit 8 is adapted to be connected to an external power source or power supply. Furthermore, the integrated motor cartridge 2 comprises a sensor data connection 10. The sensor data connection 10 inside the housing 4 is connected to a plurality of magnetic field sensors and protrudes from the housing 4, as shown in FIG. 1, to transmit the measured values of the magnetic field sensors to a control unit arranged outside of the housing 4.

Figure 2:
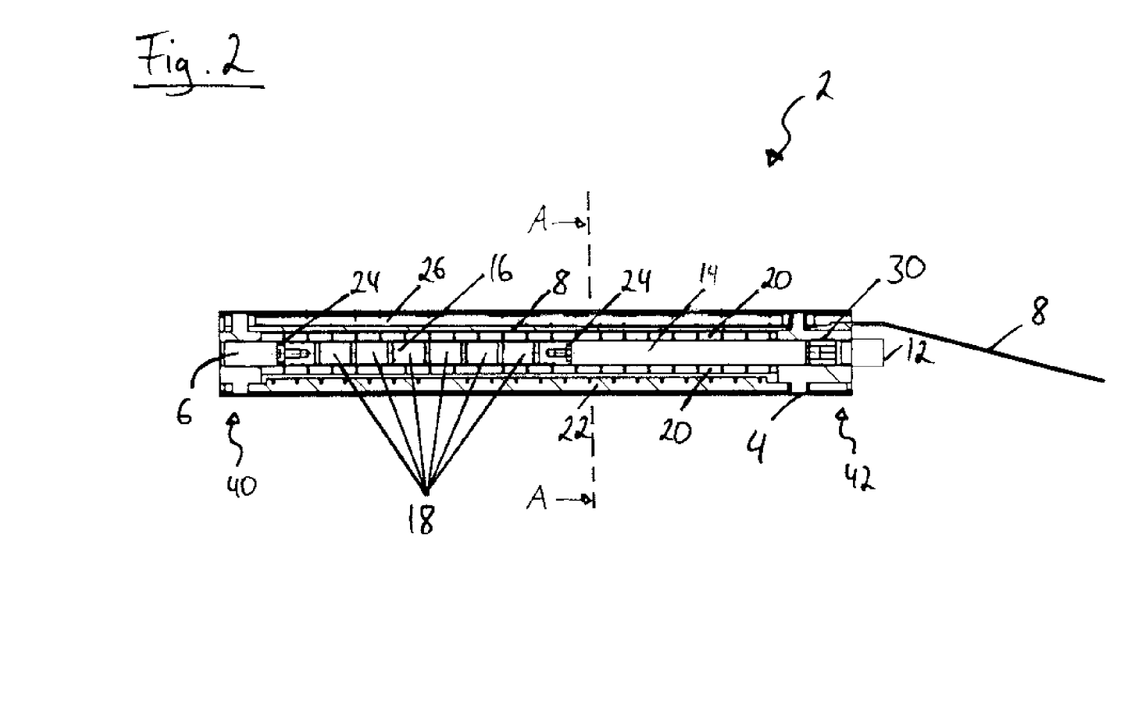
FIG. 2 shows the integrated motor cartridge of FIG. 1 in a longitudinal cross-sectional view.

FIG. 2 shows a longitudinal cross-sectional view through the integrated motor cartridge 2 of FIG. 1. In particular, FIG. 2 shows a longitudinal cross-sectional view through the integrated motor cartridge 2 along a longitudinal cross-sectional plane which is parallel to the plane shown in FIG. 1 as the upper plane of the integrated motor cartridge 2. FIG. 2 shows the housing 4 along with its components arranged therein as well as the power connection 8 protruding from the housing 4 and the guide member 12 protruding from the housing 4.

In the housing 4, a cylindrical guide tube 14 is arranged substantially centrally. The guide tube 14 terminates, in the pressure tube facing end portion 40, in the pressure tube connection 6. In the exemplary embodiment of FIG. 2, the pressure tube connection 6 is formed integrally with the guide tube 14. In particular, an end portion of the guide tube 14 forms the pressure tube connection 6. In the pressure tube distal end portion 42, there is provided a stopper/air filter unit 30. The stopper/air filter unit 30 prevents the ingress of dust into the guide tube 14 and forms the end of the motion path of the piston arranged in the guide tube 14 and described below. The central arrangement of the guide tube 14 in the housing 4 assists in applying an as uniform as possible load on the seals of the piston described below.

Around the guide tube, there is arranged a plurality of coils 20, of which only one is provided with a corresponding reference numeral. In the exemplary embodiment of FIG. 2, there are twenty coils 20. The coils 20 are arranged in a circular manner around the guide tube 14. They are arranged adjacent each other along the guide tube 14, e.g. slid onto the guide tube 14 in adjoining manner. The plurality of coils 20 are connected to the power connection 8, which, on the one hand, extends along the coils 20 from the pressure tube facing end portion 40 into the pressure tube distal end portion 42 and which, on the other hand, protrudes from the housing 4, as shown in FIG. 2 and also in FIG. 1. Energy is supplied to the coils 20 via the power connection 8.

In the exemplary embodiment of FIG. 2, the power connection 8 is a printed circuit. In particular, a conductive track is provided in the power connection 8 for each of the coils 20, in order to supply current to the coils 20. It is also possible that respective pluralities of coils 20 are supplied with current from a single conductive track of the printed circuit 8. In particular, it is possible that three current phases are made available via the printed circuit 8, with one of the three current phases being applied to each coil 20.

The guide tube 14 has a piston 16 arranged therein. The piston 16 has a seal 24 on either of its pressure tube facing side and its pressure tube distal side. By way of the seals 24, the air volume between the piston 16 and the pressure tube connection 6 on the one hand and between the piston 16 and the stopper/air filter unit 30 on the other hand are separated from each other. The piston 16 comprises six permanent magnets 18, each having the same length along the piston 16. The permanent magnets 18 are arranged in the piston 16 with like poles facing each other. An exemplary arrangement of the permanent magnets 18 would be SN-NS-SN-NS-SN-NS, with the hyphen designating the boundary between the individual permanent magnets. In FIG. 2, the boundaries between the permanent magnets 18 are indicated by double lines. By means of the permanent magnets 18, the piston 16 generates a magnetic field with alternating south and north poles which, by way of the arrangement with respectively opposing poles, are formed in a highly distinctive manner.

Furthermore, the housing 4 has a plurality of magnetic field sensors 22 arranged therein. The magnetic field sensors 22 are arranged along the guide tube 14, outside of the plurality of coils 20 and along a wall of the housing 4. A total of twenty magnetic field sensors are arranged along the guide tube 14, with the reference numeral 22 being indicated only once for the sake of clarity. In the present example, the plurality of magnetic field sensors are Hall sensors. They measure the magnetic field prevailing at the respective locations of the integrated motor cartridge 2. The measured values can be used to determine the position of the piston 16, as described below.

In the housing 4 of the integrated motor cartridge 2, there is further arranged a cooling duct 26. The cooling duct 26 is disposed along a wall of the housing 24, on the opposite side with respect to the guide tube 14 in comparison with the plurality of magnetic field sensors 22. The cooling duct 26 extends substantially from the pressure tube facing end portion 40 of the housing 4 to the pressure tube distal end portion 42 of the housing 4. The cooling duct 26 at both ends thereof has an opening through the housing 4, so that cooling air can flow from the outside through the cooling duct 26.

The operation of the integrated motor cartridge 2 will be described in the following. Current is supplied to the plurality of coils 20 via the power connection 8. By applying suitable currents to the plurality of coils 20, time-varying magnetic fields are generated which exert a mechanical force on the permanent magnets 18 of the piston 16 and move the latter within the guide tube 14. It is known to those skilled in the art how to configure the flow of current through the plurality of coils 20 to achieve a desired motion of the piston. Consequently, a more detailed description of the relationship between the motion of the piston 16 and the currents to be applied through the coils 20 can be omitted.

During operation, the plurality of magnetic field sensors measure the magnetic field prevailing at the respective locations within the housing 4. They transmit the measured values via the sensor data connection 10, described above with reference to FIG. 1, to a control unit located outside of the integrated motor cartridge 2. This control unit is able to determine the position of the piston 16 from the measured values of the magnetic field sensors 22. Based on this information and on the basis of a desired aspiration or dispensing operation, the control unit applies corresponding currents to the plurality of coils 20 via the power connection 8, so that the desired motion of the piston 16 takes place. Thus, a control loop is formed between piston 16, magnetic field sensors 22, the control unit, power connection 8, and coils 20, which allows for highly precise positioning of the piston 16 within the guide tube 14.

Figure 3:
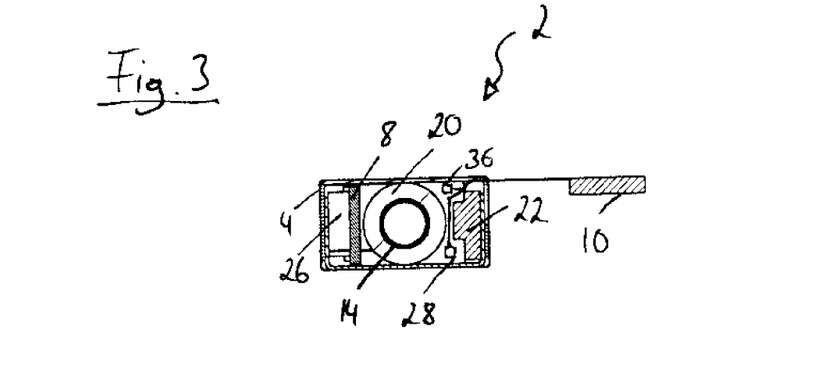
FIG. 3 shows the integrated motor cartridge of FIG. 1 in a transverse cross-sectional view.

FIG. 3 shows the integrated motor cartridge 2 of FIGS. 1 and 2 in a transverse cross-sectional view. The transverse cross-sectional plane of FIG. 3 is orthogonal to the longitudinal cross-sectional plane 2 of FIG. 2. In particular, the transverse cross-sectional plane of FIG. 3 extends along the axis designated AA in FIG. 2. FIG. 3 also shows the guide tube 14, one of the coils 20 arranged around the guide tube 14, the power connection 8, one of the magnetic field sensors 22 and the cooling duct 26. FIG. 3 nicely illustrates that the cooling duct 26 is arranged beside the power connection 8. In this way, the cooling duct 26 is located close to the power connection 8 and close to the coils 20, where most of the waste heat is generated.

In the transverse cross-sectional plane of FIG. 3, there are further arranged a temperature sensor 28 and a storage or memory element 36. The temperature sensor 28 measures the temperature within the housing 4 of the integrated motor cartridge 2. Calibration data for the integrated motor cartridge 2 are stored in the memory element 36. The calibration data include a description of the relationships between the measured values of the magnetic field sensors 22 and the position of the piston 16. Furthermore, the calibration data include a description of the magnetic field components detected by the magnetic field sensors 22, which are due to the current flow through the coils 20. Thus, with the aid of the calibration data, a control unit can exclude, by calculation, the magnetic field components caused by the coils 20 from the measured values of the magnetic field sensors 22, and can calculate the position of the piston 16 from the remaining magnetic field components. The calibration data can describe a plurality of artifacts in measuring the magnetic fields, such as e.g. offset effects of the magnetic field sensors, position inaccuracies with respect to the nominal position among the magnetic field sensors 22 and position inaccuracies with respect to the nominal position among the permanent magnets 18. The calibration data may be determined for the given specific integrated motor cartridge 2 during production thereof.

The magnetic field sensors 22, the temperature sensor 28 and the memory element 36 are connected to the sensor data connection 10. The measured values of the magnetic field sensors 22 and of the temperature sensor 28 as well as the calibration data present in the memory element 36 are read out by a control unit arranged outside of the integrated motor cartridge 4. The control unit is designed to regulate/control the currents through the coils 20 on the basis of the measurement data of the magnetic field sensors 22 and the calibration data and to thus move the piston 26 as desired.

Figure 4:
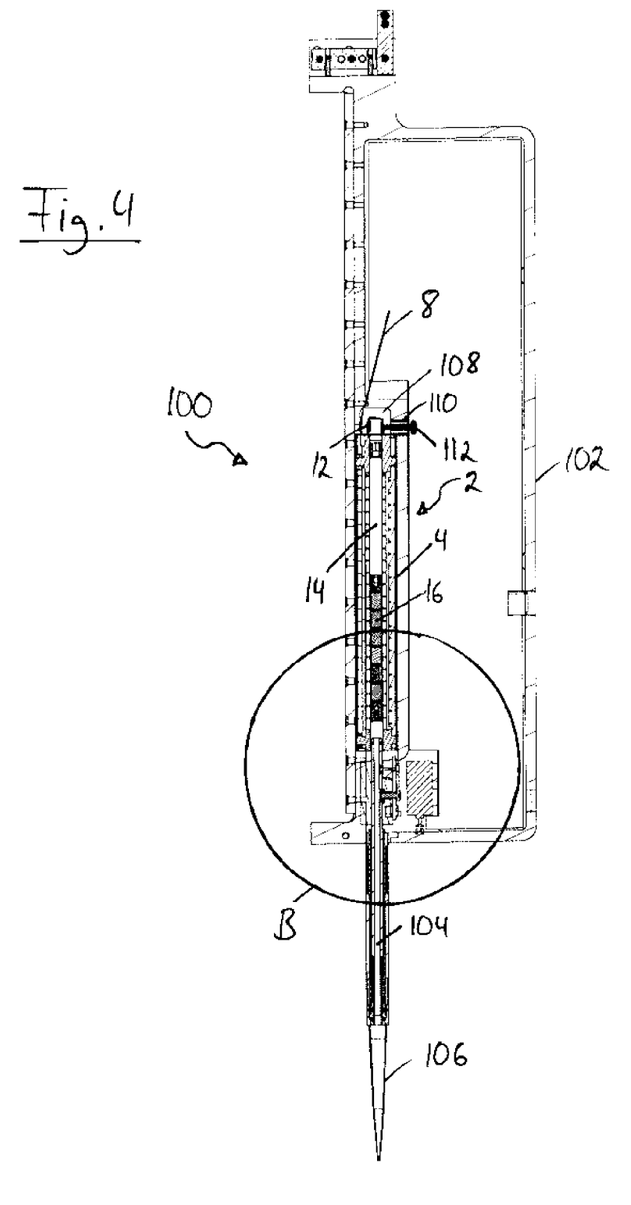
FIG. 4 shows a pipetting system according to an exemplary embodiment of the invention, in which the integrated motor cartridge of FIG. 1 is inserted.

FIG. 4 shows the integrated motor cartridge 2 of FIGS. 1 to 3 inserted in a pipetting system 100 according to an exemplary embodiment of the invention. Through the connection to the pipetting system 100 and the use in the pipetting system 100, the integrated motor cartridge 2 is part of the pipetting system 100. FIG. 4 shows the integrated motor cartridge 2 in the same longitudinal cross-sectional plane as in FIG. 2. Consequently, the pipetting system is also shown in this longitudinal cross-sectional plane.

The pipetting system 100 comprises a housing 102 in which the integrated motor cartridge 2 is arranged. Furthermore, the pipetting system 100 comprises a pressure tube 104 and a pipetting tip 106. The pressure tube 104 extends from within the housing 102, in particular from the integrated motor cartridge 2, to a location outside of the housing 102. The pressure tube 104 is fixedly connected to the housing 102 of the pipetting system. The pressure tube 104 is connected at its one end to the pressure tube connection 6 of the integrated motor cartridge, as described below with reference to the enlarged detail view of FIG. 5. At its other end, the pressure tube 104 is connected to the pipetting tip 106. The pipetting tip 106 is releasably connected to the pressure tube 104. In particular, the pipetting tip 106 can be conveniently replaced, e.g. if due to a possible contamination of the pipetting tip with a first pipetting liquid, the undisturbed pipetting of a second pipetting liquid cannot be guaranteed.

Aspirating and dispensing of a pipetting liquid through the pipetting tip 106 is effected by increasing and decreasing, respectively, a gas pressure in the compressed air volume formed by the guide tube 14 of the integrated motor cartridge 2, the pressure tube 104 and the pipetting tip 106. The increase or decrease in the gas pressure is effected by the motion of the piston 16 in the guide tube 14.

In the exemplary embodiment of FIG. 4, the integrated motor cartridge 2 is mechanically connected to the pipetting system 100 in the following manner. The pressure tube connection 6 of the integrated motor cartridge 2, i.e. in the present example the end portion of the guide tube 14 of the integrated motor cartridge 2, is placed onto a freestanding end portion of the pressure tube 104. This will be described in more detail below with reference to FIG. 5. Furthermore, the guide member 12 is arranged in a receptacle 108. The receptacle 108 is larger than the guide member 12. The guide member 12 does not abut on the surfaces of the receptacle 108. However, the guide member 12 is arranged in the defined region of the receptacle 108.

The pipetting system 100 has a locking screw 110 which is arranged in a screw thread 112 of the pipetting system 100. In particular, the locking screw 110 is threadedly engaged through the screw thread 112, so that its end is in engagement with the guide member 12. By the engagement of the locking screw 110 with the guide member 12 and the frictional engagement of the locking screw 110 in the screw thread 112, the pressure tube distal end portion of the integrated motor cartridge 2 is positionally fixed in the pipetting system 100.

Figure 5:
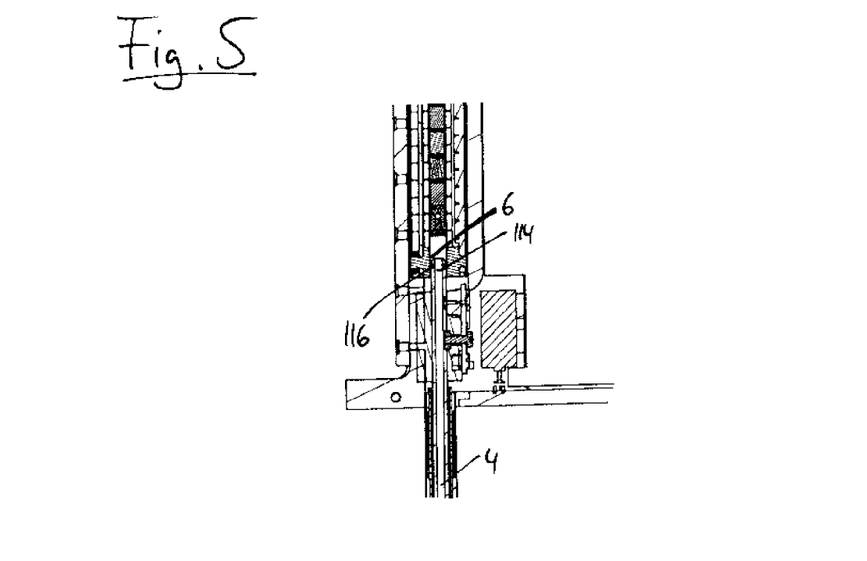
FIG. 5 shows a detail of the pipetting system of FIG. 4 in an enlarged view.

FIG. 5 shows the connection between the integrated motor cartridge 2 and the pressure tube 104 in greater detail. In particular, FIG. 5 is an enlarged view of the connection shown in FIG. 4. The region shown in FIG. 5 corresponds to the region B illustrated in a circle in FIG. 4.

The pressure tube 104 has a free end 114 towards the integrated motor cartridge 2. Around the free end 114, an O-ring 116 is mounted. The pressure tube connection 6 is plugged onto the free end 114. As a result of this attachment, the position of the integrated motor cartridge 2 relative to the housing 102 of the pipetting system 100 is fixed. In addition, the O-ring 116 provides a gastight connection between the free end 114 of the pressure tube 104 and the pressure tube connection 6. Thus, when the integrated motor cartridge 2 is connected to the pressure tube 104, there is created a closed volume, which is closed with the exception of the opening in the pipetting tip and consists of part of the guide tube 14, the pressure tube 104 and the pipetting tip 106.

In addition to the mechanical connection between the integrated motor cartridge 2 and the pipetting system 100 described above with reference to FIGS. 4 and 5, the integrated motor cartridge 2 is also connected to the pipetting system 100 via the power connection 8 and the sensor data connection 10. While the power connection 8 is shown in FIG. 4, the sensor data connection 10 is outside the cross-sectional plane of FIGS. 4 and 5.

Figure 6:
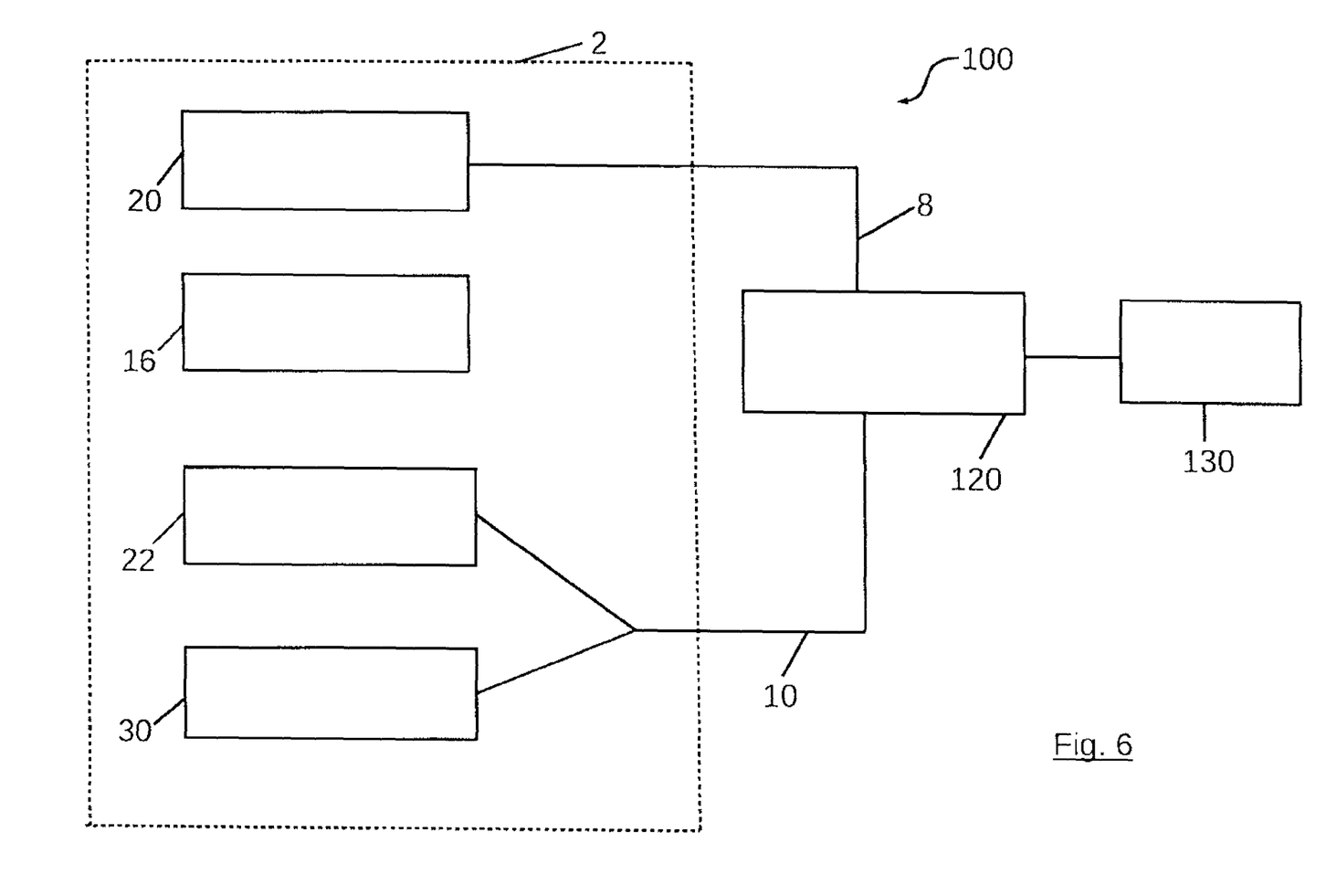
FIG. 6 shows selected components of the pipetting system of FIG. 4 in a block diagram.

FIG. 6 shows the connections between the integrated motor cartridge 2 and the pipetting system 100 for controlling the electric motor of the integrated motor cartridge 2 in a block diagram. The block diagram of FIG. 6 is an abstract representation of the pipetting system of FIGS. 4 and 5 on the basis of part of the functional components thereof. The components contained in the integrated motor cartridge 2 are shown in a frame in dashed lines, while the components located outside of the integrated motor cartridge 2 are shown outside of the frame in dashed lines. All of the components belong to the pipetting system 100.

The integrated motor cartridge 2 is connected to a control unit 120 of the pipetting system 100 via the power connection 8 and via the sensor data connection 10. The control unit 120 is further connected to a power supply 130. On the basis of a desired motion of the piston 16, the control unit 120 determines the currents to be applied to the coils 20. The control unit 120 is fed with energy from the power supply 130 and conditions the energy received from the power supply 130 such that the currents necessary for the desired motion of the piston 16 are applied to the coils 20 via the power connection 8.

The control unit 120 is connected to the plurality of magnetic field sensors 22 and to the memory element 36 via the sensor data connection 10. The memory element 36 contains calibration data relating to the position measurement of the piston 16. This calibration data are read out by the control unit 120 and used to determine the position of the piston 16. The magnetic field sensors 22 measure the magnetic field presently prevailing at the positions of the magnetic field sensors 22. The measured values thus represent a spatial distribution of the momentary magnetic field. This magnetic field consists of two main components, namely a component generated by the current through the coils 20 and a component generated by the permanent magnets of the piston 16. The control unit 120 uses the calibration data to eliminate the first-mentioned component of the magnetic field from the measured values, at least to a substantial extent. Furthermore, the control unit 120 calculates the position of the piston 16 from the second component by means of the calibration data. The second component has a strong periodic contribution due to the alternating orientation of the permanent magnets in the piston 16. The calibration data include a description of offset effects of the magnetic field sensors 22, deviations of the positions of the magnetic field sensors 22 from a uniform distribution along the guide tube and deviations of the arrangement of the permanent magnets and their poles from a uniform distribution. With the aid of the calibration data, the control unit 120 adjusts the measured values of the magnetic field sensors 22 and determines the position of the piston 16 with high precision. The control unit 120 thus receives a feedback regarding the position of the piston 16 and can thereby move the same very precisely in the guide tube.

Figure 7:
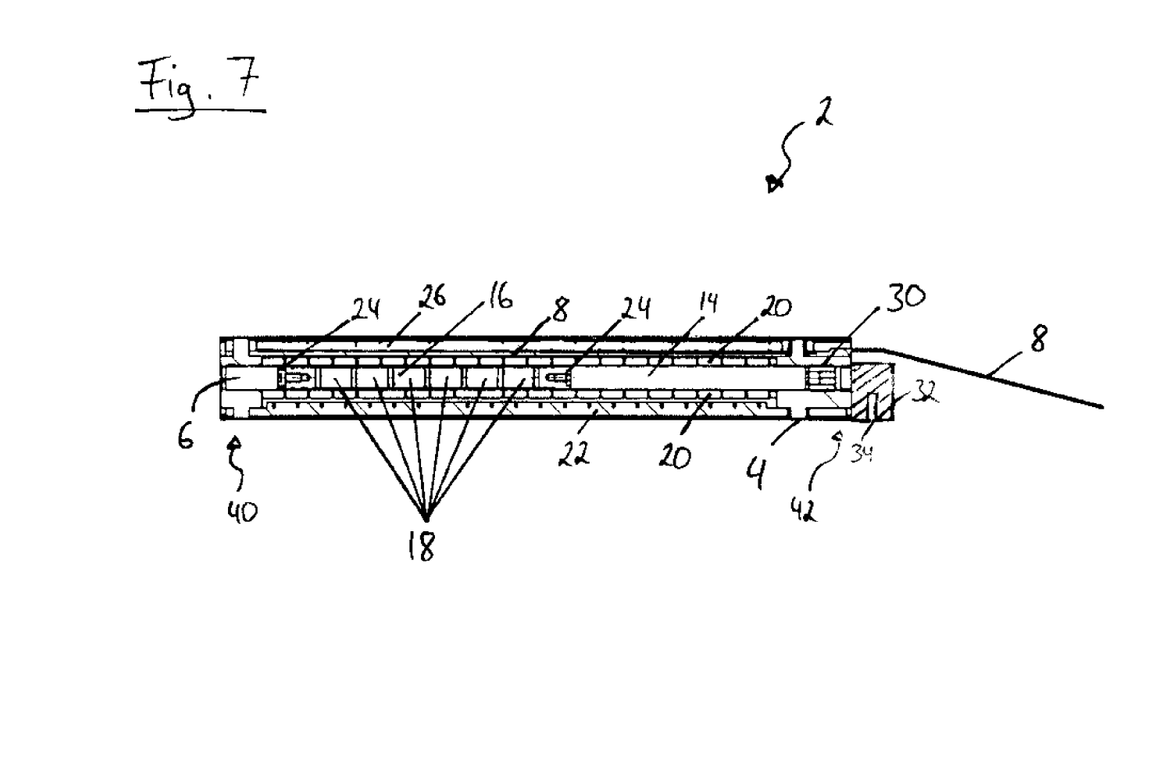
FIG. 7 shows an integrated motor cartridge according to a further exemplary embodiment of the invention in a longitudinal sectional view.

FIG. 7 shows an integrated motor cartridge 2 according to a further embodiment of the invention in a longitudinal cross-sectional view. The integrated motor cartridge 2 of FIG. 7 is very similar to the integrated motor cartridge 2 of FIGS. 1 to 3. In addition, the longitudinal cross-sectional plane of FIG. 7 corresponds to the longitudinal cross-sectional plane of FIG. 2. For those features of the integrated motor cartridge 2 of FIG. 7 which are not described in detail below, reference is made to the above description of FIGS. 1 to 3, in particular of FIG. 2.

The integrated motor cartridge 2 of FIG. 7 has no guide member 12, but has a different type of support in the pressure tube distal end portion 42 of the housing 4 for fixing the position relative to a pipetting system. The integrated motor cartridge 2 of FIG. 7 comprises a support 32 having a threaded hole 34. A locking screw of a pipetting system can be threadedly engaged in the threaded hole 34 and thus fix the integrated motor cartridge 2 with respect to the pipetting system in the pressure tube distal end portion 42 of the housing 4.

The integrated motor cartridges of the exemplary embodiments described above allow the replacement of the electric motor of a pipetting system as a complete unit and thus reduce the maintenance expenditure for pipetting systems. Quite particularly advantageously, the described integrated motor cartridges can be used in relatively novel pipetting systems, which move the piston back and forth for a pipetting operation at a very high speed, with the stroke of the piston being many times higher than the volume of the aspirated or dispensed liquid and with the aspiration and dispensing of the liquid taking place by way of a pressure wave built up with high dynamics. Especially in such a system characterized by high dynamics, the wear of the components of the electric motor can be high and have a negative effect on the performance of the pipetting system. Accordingly, the maintenance of such pipetting systems is of great importance. Such a high-dynamics pipetting system is disclosed in WO 2017/0107084 A1. The content of the afore-mentioned application is fully incorporated in the present patent application by making reference thereto. In particular, the pipetting system of the present patent application can be implemented further with all the features of the claims of WO 2017/0107084 A1, individually or in any combination.

Although the invention has been described with reference to exemplary embodiments, it will be apparent to those skilled in the art that various changes may be made and equivalents may be employed without departing from the scope of the invention. The invention should not be limited by the specific embodiments described. Rather, it includes all embodiments that are covered by the appended claims.

The invention claimed is:

1. An integrated motor cartridge for connection to and for use in a pipetting system, comprising:
   a guide tube;
   a piston provided with a plurality of permanent magnets, the piston having a pressure tube facing side and a pressure tube distal side, wherein the piston is arranged in the guide tube and has at least one seal with respect to the guide tube;
   a coil assembly by means of which the piston can be moved in the guide tube when current is supplied to the coil assembly,
   a housing, wherein the guide tube, the piston and the coil assembly are arranged in the housing;
   a plurality of magnetic field sensors arranged within the housing along the guide tube for determining the position of the piston;
   a non-transitory memory element arranged within the housing, the memory element having calibration data stored thereon, the calibration data describing a correlation between measured values of the magnetic field sensors and the position of the piston;
   a pressure tube connection by means of which the guide tube, on the pressure tube facing side, can be connected in a gastight manner to a pressure tube of the pipetting system;
   a power connection coupled to the coil assembly and adapted to be coupled to a power supply arranged outside of the integrated motor cartridge; and
   a cooling duct arranged within the housing along the guide tube and having a first opening through the housing on the pressure tube facing side of the housing and a second opening through the housing on the pressure tube distal side of the housing,
   wherein the integrated motor cartridge can be introduced into and removed from the pipetting system as a unit.

2. The integrated motor cartridge according to claim 1, wherein the pressure tube connection is designed to fix the position of the integrated motor cartridge with respect to the pipetting system.

3. The integrated motor cartridge according to claim 1, wherein the pressure tube connection has a receptacle for a motor facing side of the pressure tube.

4. The integrated motor cartridge according to claim 3, wherein the receptacle has a contact surface for an O-ring arranged around the pressure tube.

5. The integrated motor cartridge according to claim 1, wherein the power connection is designed as a printed circuit.

6. The integrated motor cartridge according to claim 5, wherein the printed circuit is disposed within the housing along the guide tube and/or extends through the housing in a pressure tube distal end portion of the integrated motor cartridge.

7. The integrated motor cartridge according to claim 1, further comprising:
   a sensor data connection coupled to the plurality of magnetic field sensors and adapted to be coupled to a control unit of the pipetting system arranged outside of the integrated motor cartridge.

8. The integrated motor cartridge according to claim 1, wherein the calibration data further include a description of the influence of a current flow of the coil assembly on the measured values of the magnetic field sensors.

9. The integrated motor cartridge according to claim 1, wherein the calibration data are adapted to be read out by a control unit of the pipetting system.

10. The integrated motor cartridge according to claim 1, wherein the coil assembly comprises a plurality of coils arranged in a circular manner around the guide tube.

11. The integrated motor cartridge according to claim 1, wherein the housing is made of a magnetically soft material.

12. The integrated motor cartridge according to claim 1, wherein the size of the housing is adapted to a standardized grid pattern of the pipetting system.

13. The integrated motor cartridge according to claim 1, wherein the housing has a substantially rectangular cross section and/or wherein the housing, in cross section, has an area between 100 mm$^2$ and 150 mm$^2$.

14. The integrated motor cartridge according to claim 1, wherein the piston has a seal with respect to the guide tube on the pressure tube facing side.

15. The integrated motor cartridge according to claim 1, wherein a complete travel way of the piston is within the housing.

16. The integrated motor cartridge according to claim 1, wherein a stopper for the piston or an air filter or an integrated stopper/air filter unit is provided on the pressure tube distal side of the guide tube.

17. The integrated motor cartridge according to claim 1, further comprising a temperature sensor arranged within the housing for temperature measurement within the integrated motor cartridge.

18. The integrated motor cartridge according to claim 1, further comprising a support on the pressure tube distal side of the housing, with which the integrated motor cartridge can be fixed with respect to the pipetting system.

19. The integrated motor cartridge according to claim 18, wherein the support has a receptacle for introducing a locking element provided on the pipetting system.

20. The integrated motor cartridge according to claim 1, wherein the integrated motor cartridge further comprises a support on the pressure tube distal side of the housing, with which the integrated motor cartridge can be fixed with respect to the pipetting system, wherein the support has a contact surface adapted to be engaged with a complementary contact surface of the pipetting system for alignment of the integrated motor cartridge; or wherein the integrated motor cartridge has a guide member adapted to be introduced in a recess of the pipetting system for alignment of the integrated motor cartridge.

21. An integrated motor cartridge for connection to and for use in a pipetting system, comprising:

a guide tube;

a piston provided with a plurality of permanent magnets, the piston having a pressure tube facing side and a pressure tube distal side, wherein the piston is arranged in the guide tube and wherein the piston has at least one seal with respect to the guide tube;

a coil assembly by means of which the piston can be moved in the guide tube when current is supplied to the coil assembly;

a housing, wherein the guide tube, the piston and the coil assembly are arranged in the housing;

a pressure tube connection by means of which the guide tube, on the pressure tube facing side, can be connected in a gastight manner to a pressure tube of the pipetting system;

a power connection coupled to the coil assembly and adapted to be coupled to a power supply arranged outside of the integrated motor cartridge; and a support on the pressure tube distal side of the housing with which the integrated motor cartridge can be fixed with respect to the pipetting system, wherein the support has a hole or a threaded hole for introducing a locking pin or a locking screw provided on the pipetting system, wherein the integrated motor cartridge can be introduced into and removed from the pipetting system as a unit.

* * * * *